Figure 1:
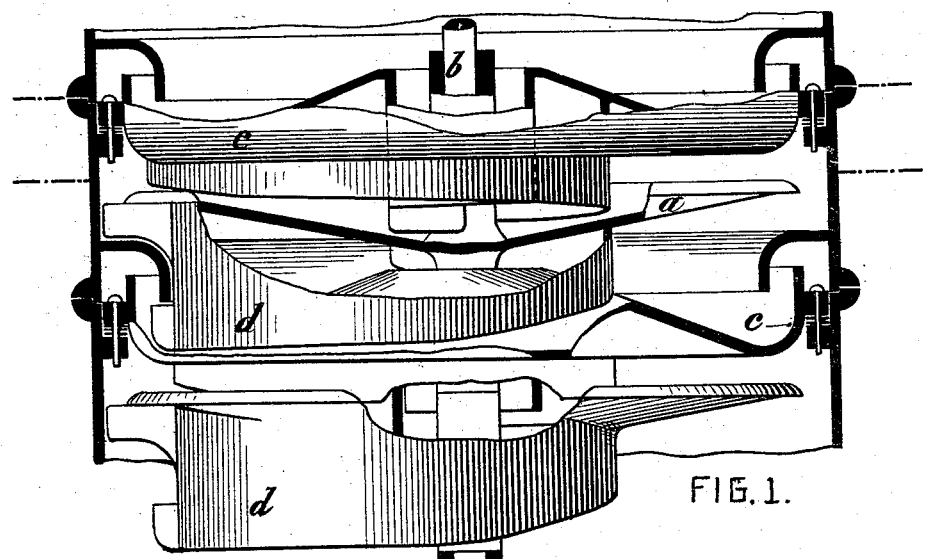

(No Model.) 11 Sheets—Sheet 1.

P. A. MALLET & T. A. PAGNIEZ.
DISTILLATION APPARATUS.

No. 534,719. Patented Feb. 26, 1895.

ATTEST

INVENTORS
Paul Alfred Mallet,
Tiburce Albert Pagniez,
BY Briesen & Knauth
ATTORNEYS.

(No Model.) 11 Sheets—Sheet 2.

P. A. MALLET & T. A. PAGNIEZ.
DISTILLATION APPARATUS.

No. 534,719. Patented Feb. 26, 1895.

ATTEST
[signatures]

INVENTORS
Paul Alfred Mallet,
Tiburce Albert Pagniez,
BY Briesen & Knauth
ATTORNEYS.

(No Model.) 11 Sheets—Sheet 3.
P. A. MALLET & T. A. PAGNIEZ.
DISTILLATION APPARATUS.
No. 534,719. Patented Feb. 26, 1895.

ATTEST
INVENTORS
Paul Alfred Mallet,
Tiburce Albert Pagniez,
BY Briesen & Knauth
ATTORNEYS.

(No Model.) 11 Sheets—Sheet 4.

P. A. MALLET & T. A. PAGNIEZ.
DISTILLATION APPARATUS.

No. 534,719. Patented Feb. 26, 1895.

(No Model.) 11 Sheets—Sheet 6.
P. A. MALLET & T. A. PAGNIEZ.
DISTILLATION APPARATUS.
No. 534,719. Patented Feb. 26, 1895.
FIG. 8. FIG. 9.
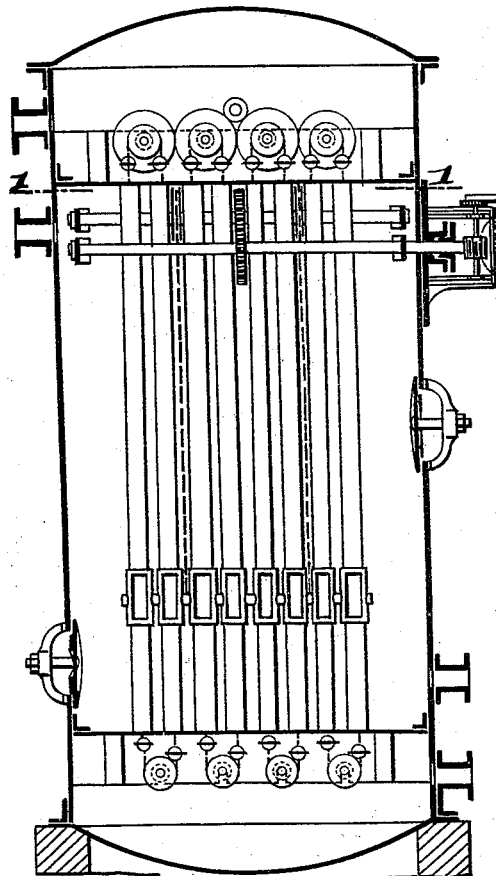
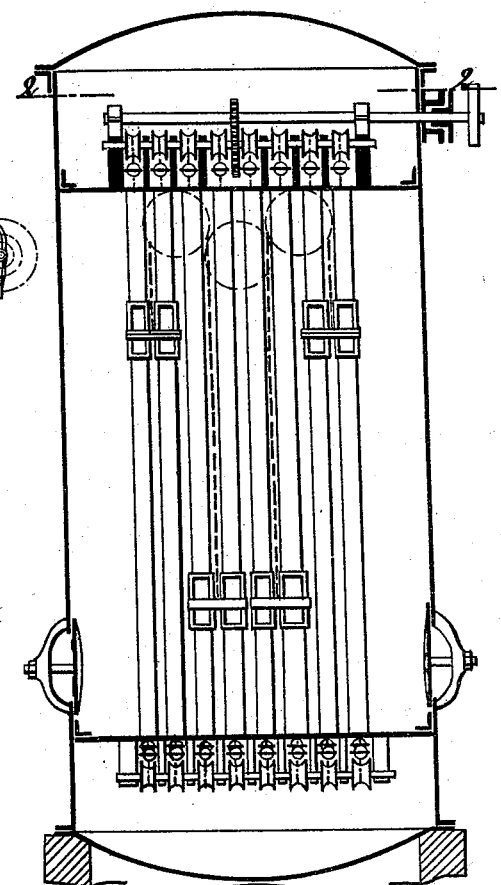
FIG. 10. FIG. 11.
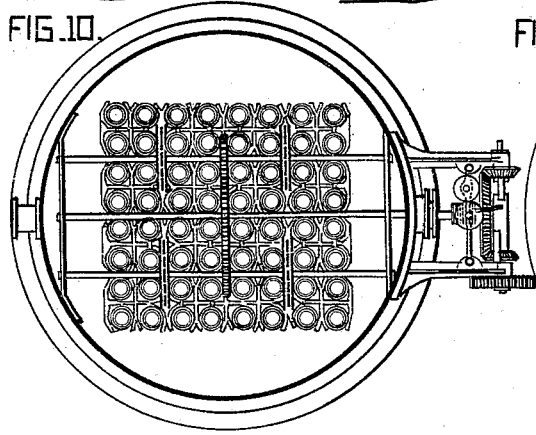
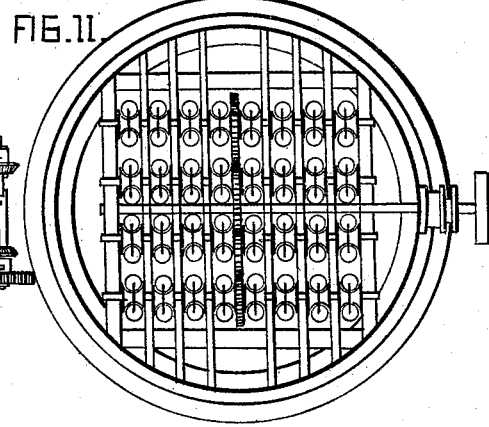
ATTEST
Chs B Shepherd.
L. M. Wachschlager.
INVENTORS
Paul Alfred Mallet
Tiburce Albert Pagniez
BY Briesen & Knauth
ATTORNEYS.

(No Model.) 11 Sheets—Sheet 7.
P. A. MALLET & T. A. PAGNIEZ.
DISTILLATION APPARATUS.
No. 534,719. Patented Feb. 26, 1895.
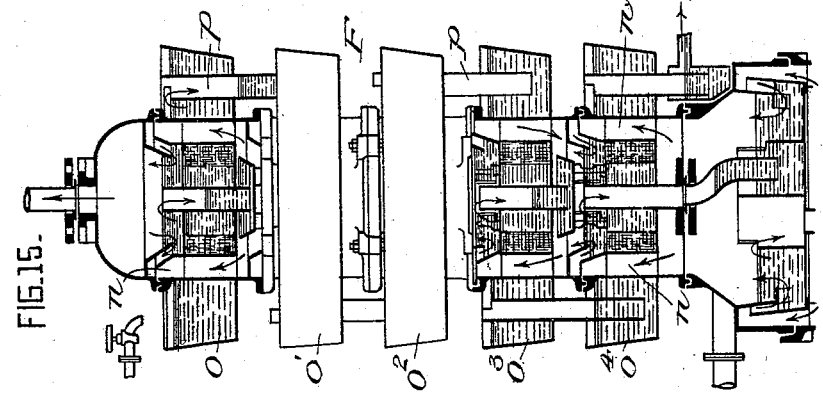
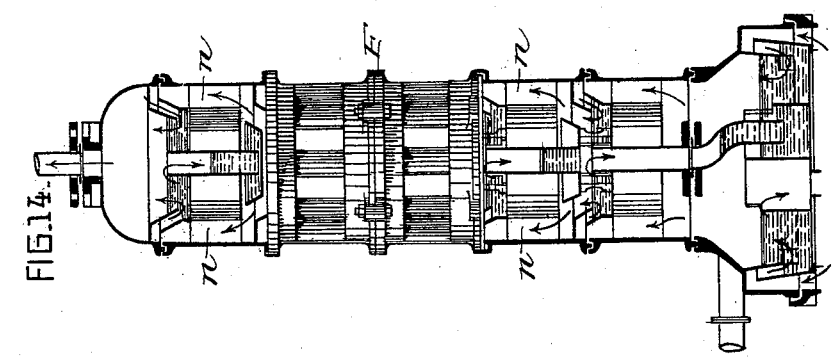
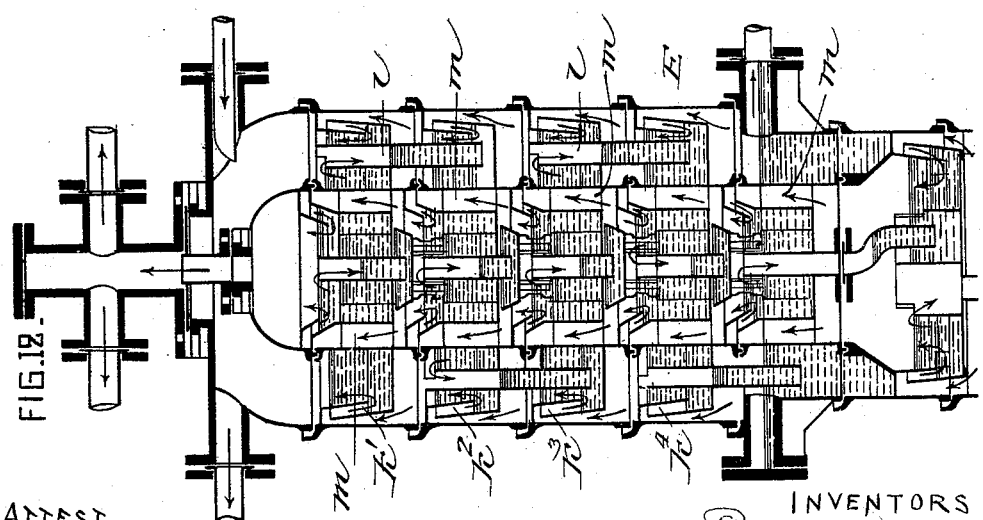
ATTEST
R. B. Shepherd.
L. M. Fachschlager.
INVENTORS
Paul Alfred Mallet
Tiburce Albert Pagniez
BY Briesen & Knauth
ATTORNEYS (No Model.) 11 Sheets—Sheet 8.

P. A. MALLET & T. A. PAGNIEZ.
DISTILLATION APPARATUS.

No. 534,719. Patented Feb. 26, 1895.

(No Model.) 11 Sheets—Sheet 9.

P. A. MALLET & T. A. PAGNIEZ.
DISTILLATION APPARATUS.

No. 534,719. Patented Feb. 26, 1895.

(No Model.) 11 Sheets—Sheet 10.

P. A. MALLET & T. A. PAGNIEZ.
DISTILLATION APPARATUS.

No. 534,719. Patented Feb. 26, 1895.

ATTEST
INVENTORS
Paul Alfred Mallet,
Tiburce Albert Pagniez,
BY Briesen & Knauth
ATTORNEYS.

(No Model.) 11 Sheets—Sheet 11.

P. A. MALLET & T. A. PAGNIEZ.
DISTILLATION APPARATUS.

No. 534,719. Patented Feb. 26, 1895.

Witnesses:
L. M. Wachschlager.

Inventors
Paul A. Mallet
Tiburce A. Pagniez
By Briesen & Knauth
their Attorneys

UNITED STATES PATENT OFFICE.

PAUL ALFRED MALLET AND TIBURCE ALBERT PAGNIEZ, OF PARIS, FRANCE.

DISTILLATION APPARATUS.

SPECIFICATION forming part of Letters Patent No. 534,719, dated February 26, 1895.

Application filed May 25, 1893. Serial No. 475,421. (No model.)

*To all whom it may concern:*

Be it known that we, PAUL ALFRED MALLET and TIBURCE ALBERT PAGNIEZ, of the city of Paris, France, have invented a Distillation Apparatus, of which the following is a full, clear, and exact description.

This invention relates to a distillation apparatus.

The apparatus comprises the following parts: a distillatory column provided with revolving trays for agitating the liquid and preventing obstruction of the column, a conveyer for introducing the solid reagents into the column, an analyzer-separator provided or not with revolving trays for agitating the liquid, a heater provided with means for agitating the matters to be distilled, and a condenser of the distilled products.

The invention will be described with reference to the accompanying drawings, forming part of this specification, which illustrate the various parts of which the distilling apparatus is composed.

Figure 2:
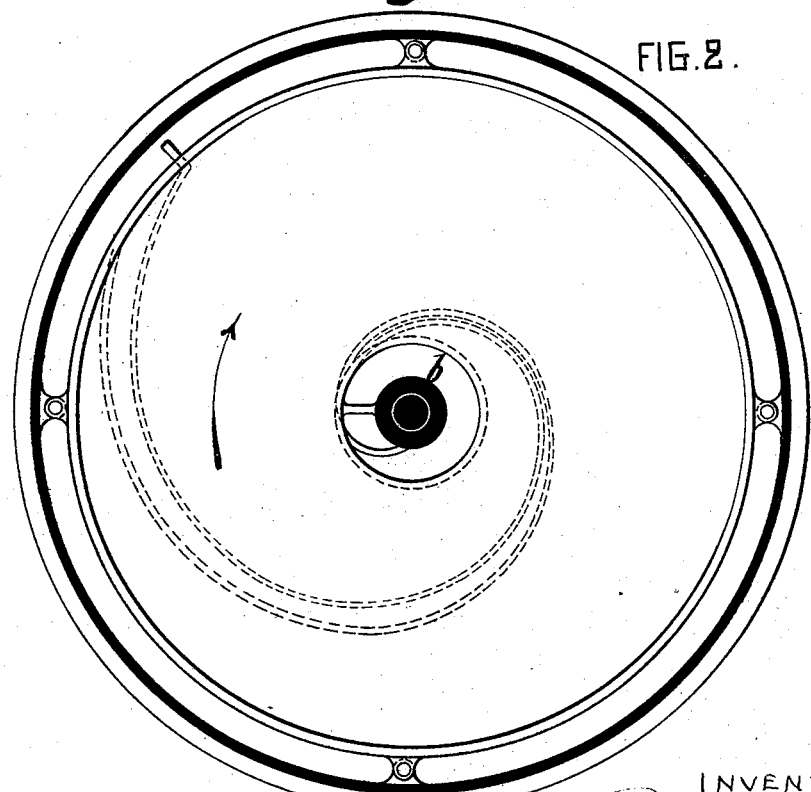
Figure 3:
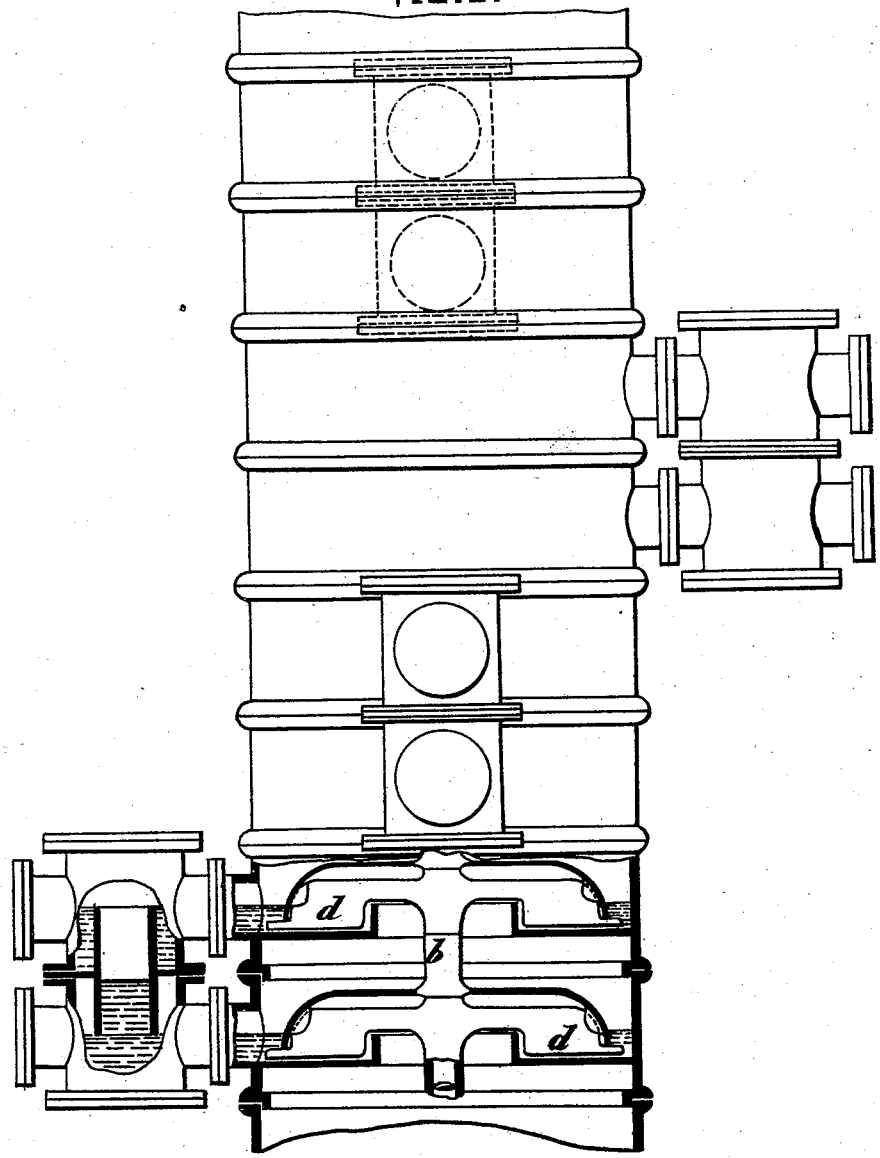
Figure 5:
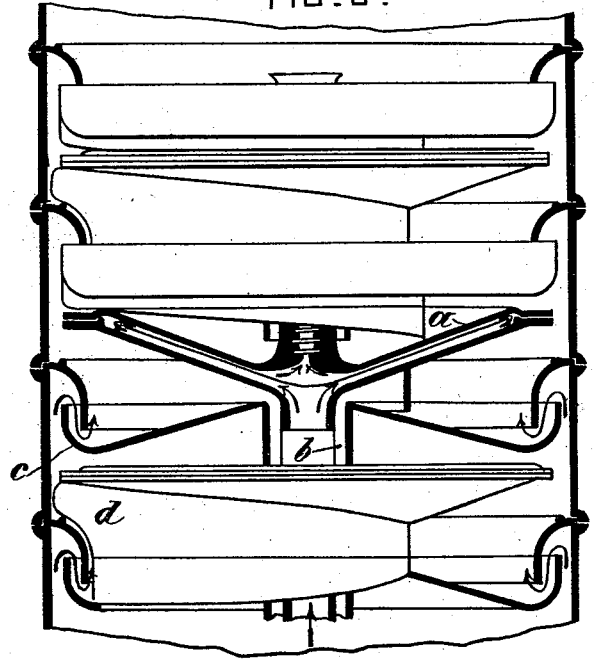
Figure 6:
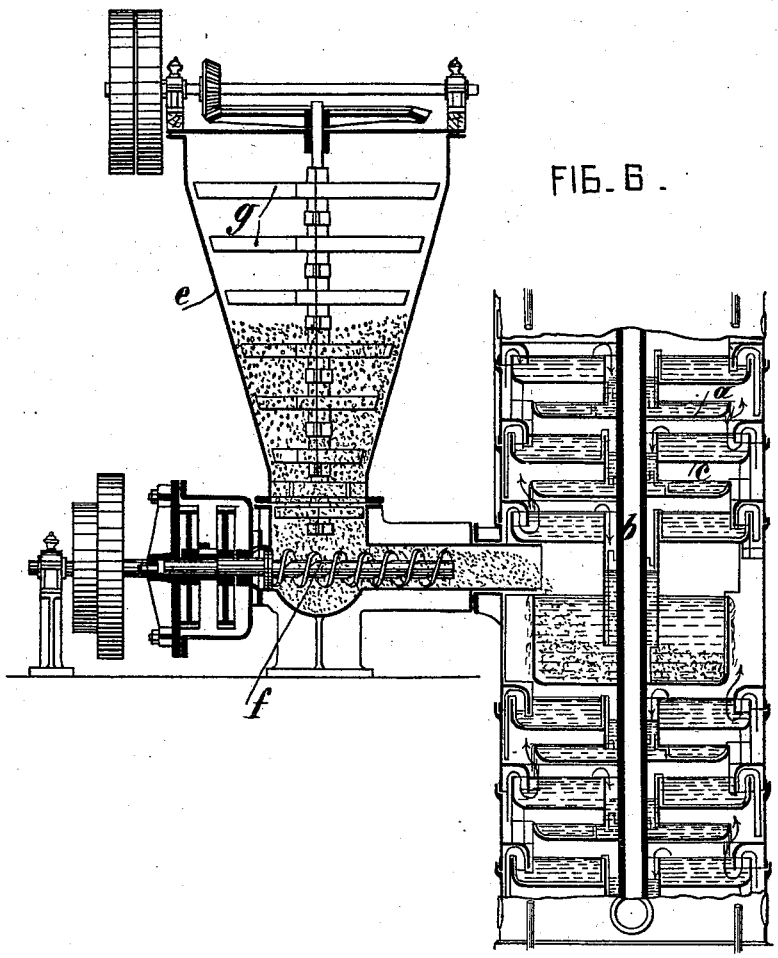
Figure 13:
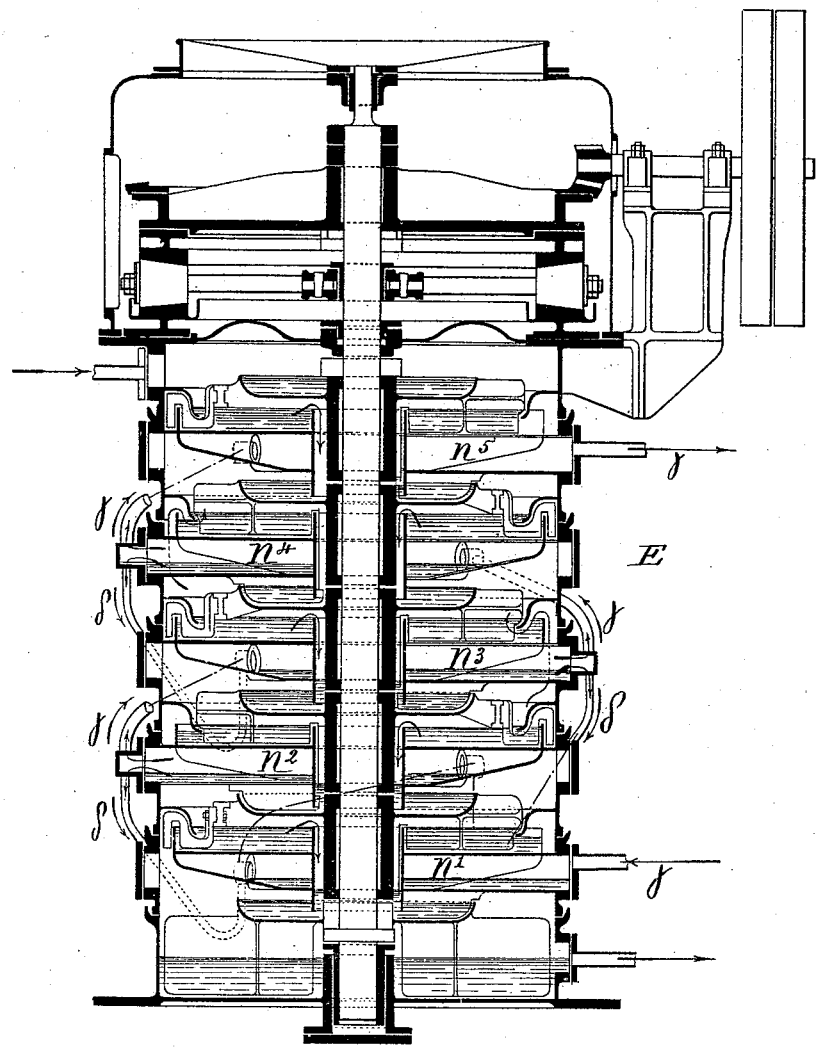
Figure 13A:
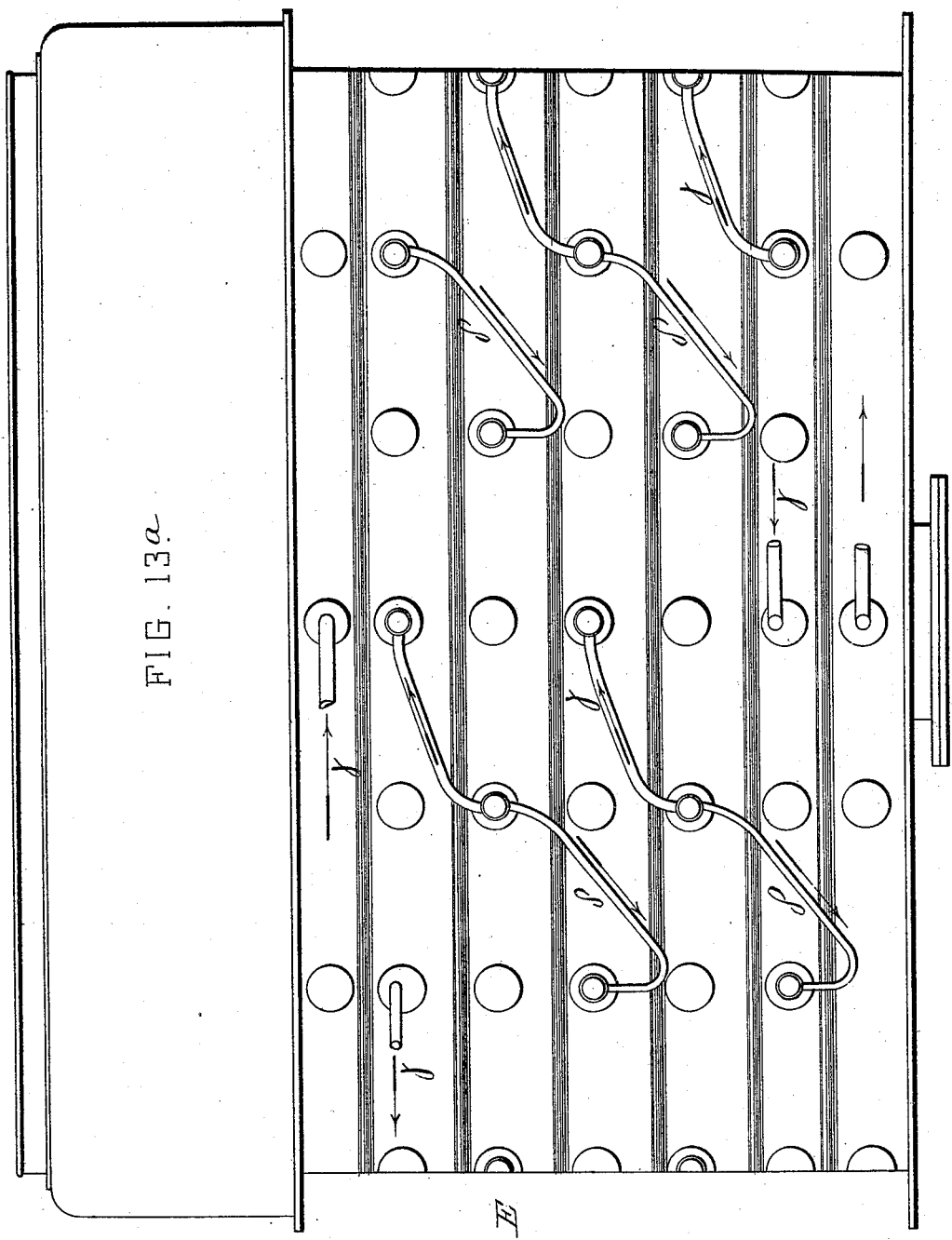
Figure 16:
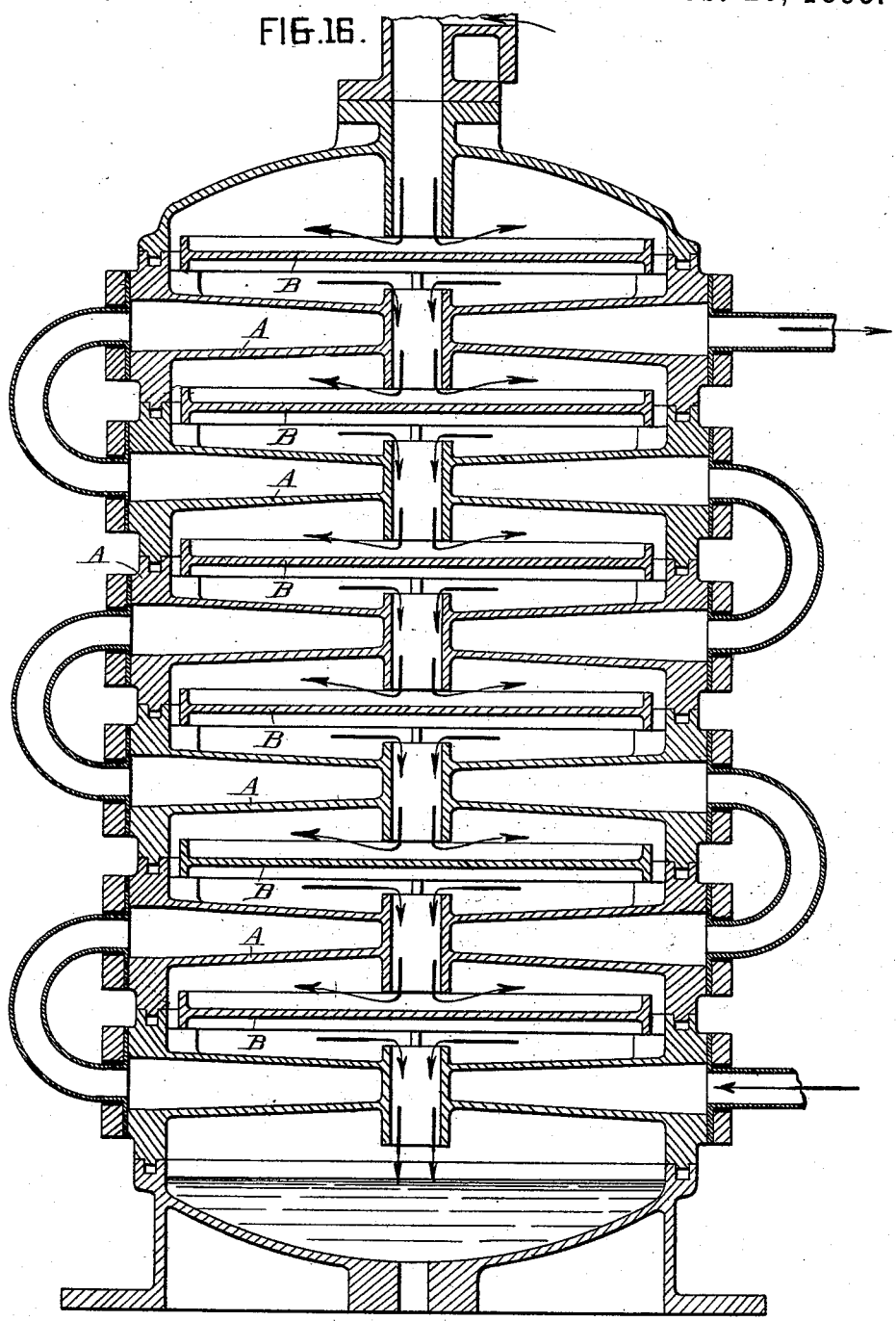
Figure 17A:
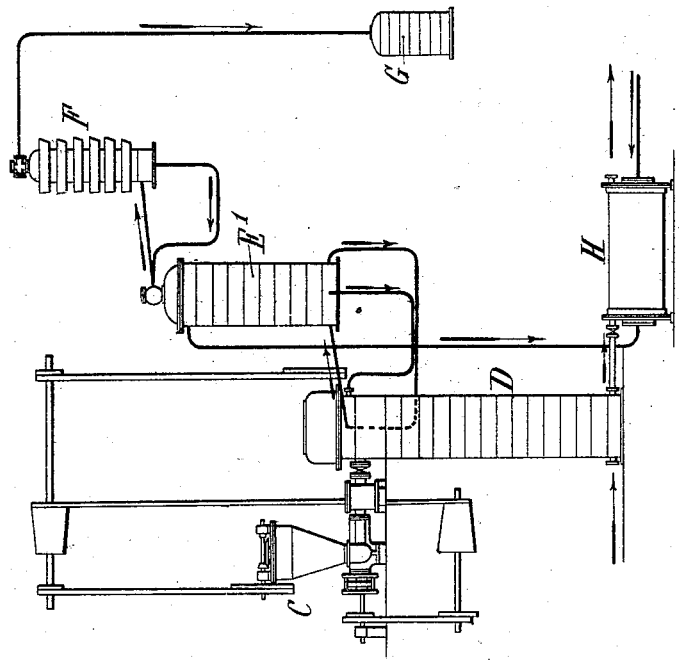
Figure 17:
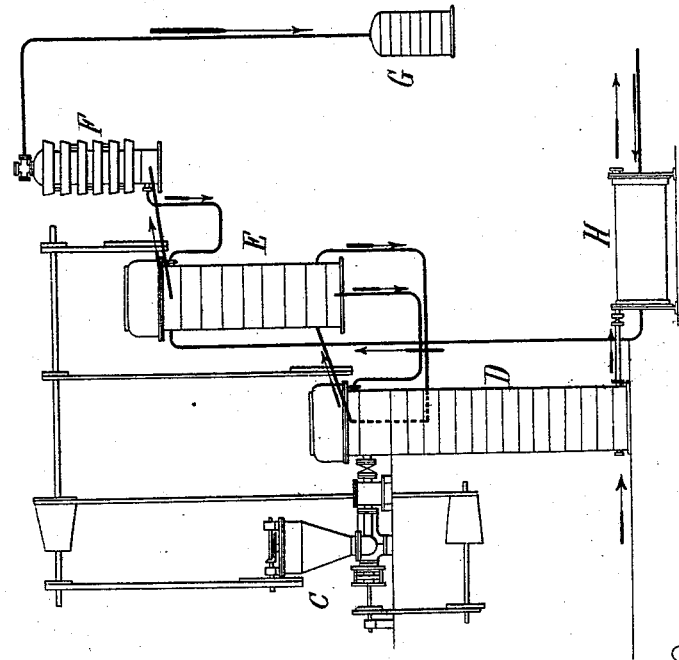

Figure 1 represents one element, partly in section, of the upper part of the distilling column, and Fig. 2 a horizontal section of the same, so taken as to show the spiral scraper or the stationary tray and also that of the revolving tray. Fig. 3 is a part elevation showing in section one element at the lower part of the column, and Fig. 4 a horizontal section of the same, the direction of motion of the shaft being indicated by the arrows. Fig. 5 shows in vertical section the shaft and trays made hollow for the circulation of cold water. Fig. 6 is a vertical section of the feed conveyer, and Fig. 7 a similar section of the feed conveyer combined with a diluter. Figs. 8, 9, 10 and 11 represent vertical and horizontal sections of the heater. Fig. 12 is a vertical section of the analyzer for use when the liquids to be distilled are clear, and Fig. 13 a part sectional elevation of an analyzer provided with revolving trays for use in distilling thick liquids. Fig. 13ᵃ is a side view of the same. Fig. 14 is a part sectional elevation of a drier, cooled by means of air, and Fig. 15 a similar section of a drier cooled by means of water. Fig. 16 is a section of the condenser-dissolver. Figs. 17 and 17ᵃ are views of the general arrangement of the parts of the apparatus, Fig. 17 having the analyzer which is absent in Fig. 17ᵃ.

In distilling liquids containing solid matters or liable to yield precipitates in the distilling column, the latter becomes quickly clogged so that the distillation is either imperfectly performed or becomes arrested. The distilling column of our invention not only prevents stagnation of the liquids and the consequent obstruction of the apparatus, but also permits of distilling liquids of a very thick consistency or containing a large amount of solid substances which would prevent their circulating in the ordinary columns. To obtain this result, the solid or pasty matters are caused to circulate by mechanical means, simultaneously with the liquids while at same time maintaining the bubbling through the liquid of the gases or vapors which constitutes the principle of a distilling column.

The upper part of the column is provided with concavely-coned trays $a$ keyed on a vertical shaft $b$ which extends the entire height of the column, these trays $a$ being arranged alternately with trays $c$ which are coned in the opposite direction to trays $a$ and are fixed to the walls of the column by lugs $z$, an annular space $y$ being left between the wall of the column and the upwardly-turned sides of the trays $c$ for the passage of the gases.

Fixed to the walls of the column, below the edges of the revolving trays $a$ and above the trays $c$, are annular curtains or lips $x$ which cover over the said space $y$ and dip down within the trays $c$ so as to conduct thereinto the pasty matters falling from the edges of the trays $a$. The fixed trays $c$ have central annular passages $w$ leading down into the revolving trays $a$ below.

To the under side of each revolving tray $a$ is fixed a convolute scraper $d$ which revolves in the fixed tray $c$ below, and to the under side of each stationary tray $c$ is fixed a convolute scraper $v$ which remains stationary within the revolving tray $a$ below. Thus the liquids, in a more or less pasty condition, pass from the trays $a$ over the lips $x$ to the fixed trays $c$ near their circumference and are carried by the convolute scrapers $d$ revolving with trays $a$ from the circumference to the center of trays c and are discharged at the center through passages w on to the trays a revolving in the direction of the arrow upon which they are caused to pass from the center to the circumference by the fixed convolute scrapers v.

The gases and vapors bubble through the liquids contained in the fixed trays and traverse the liquids in falling from the rotary trays on to the fixed ones. Should the apparatus happen to become clogged, it is only necessary, in order to free it, to increase the speed of rotation.

Figure 4:
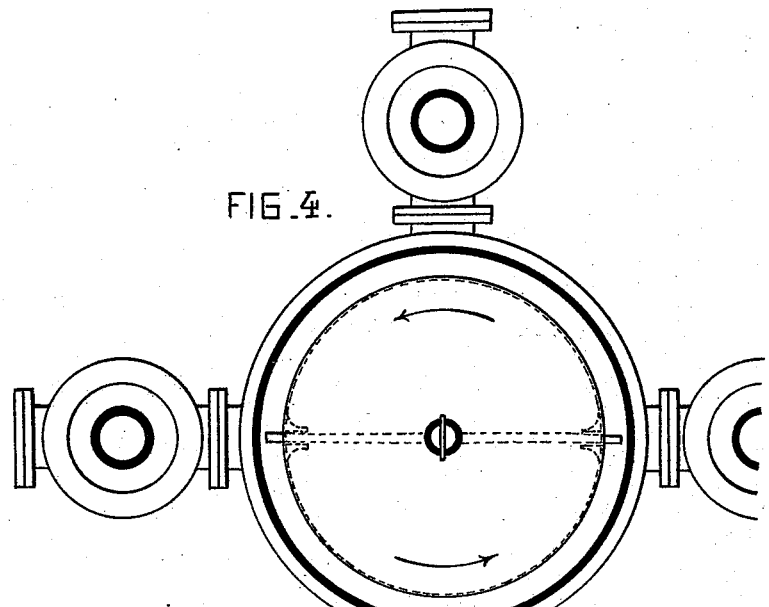

As it often happens that the liquids under distillation become less thick as they become heated, or as the solid reagent gradually dissolves, the stirring may be less energetic in the lower trays of the column, as shown in Figs. 3 and 4. The action will be readily understood from the drawings without further description.

The lower trays may in some cases be dispensed with and only those of the first type be employed or vice versa.

When it is required that the reactions be produced in the column at a low temperature, we employ a hollow shaft and trays (as shown in Fig. 5) which may be traversed by a current of cold water.

Figure 7:
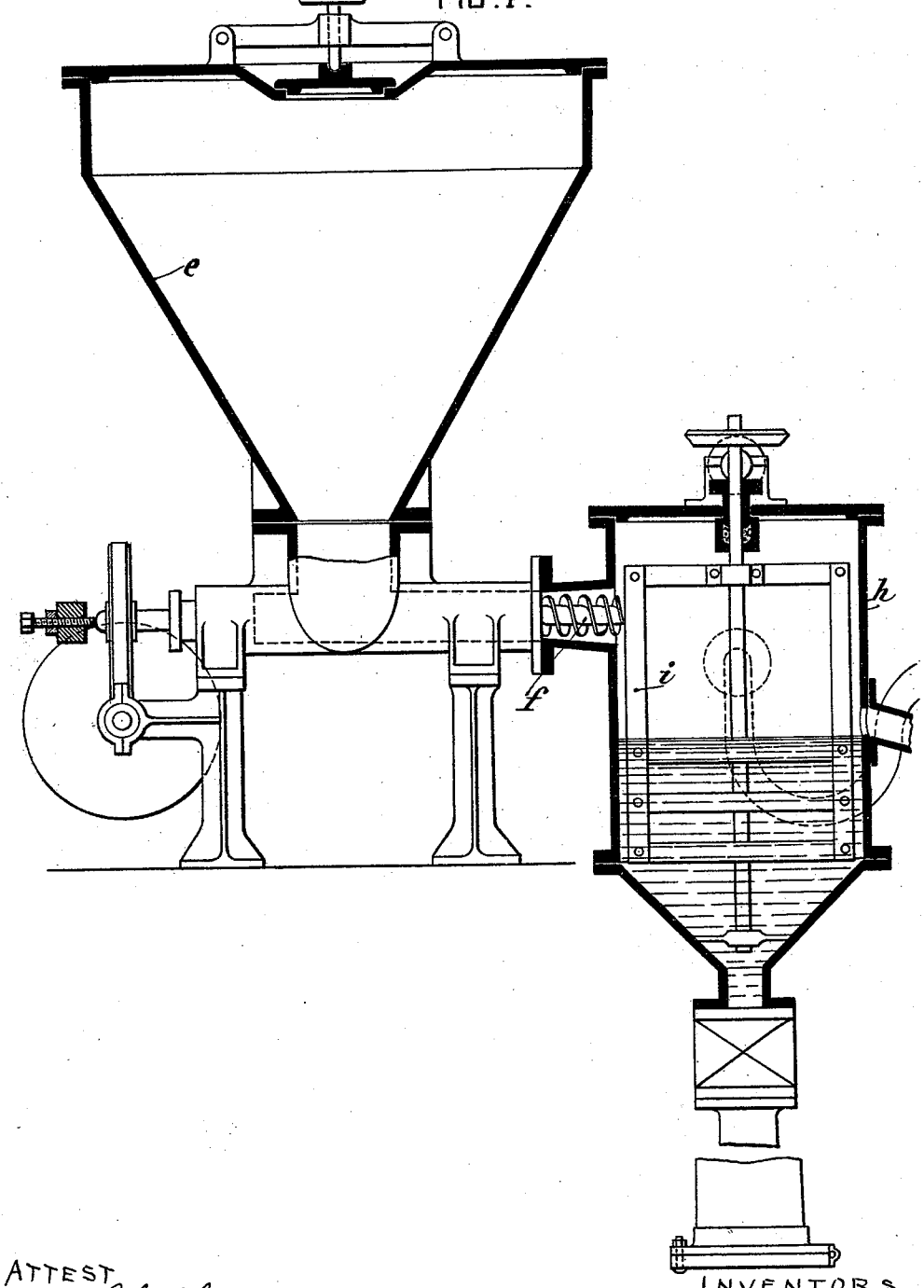

When the above described apparatus is intended for causing gases or vapors to react on liquids to which solid matters are added, this addition should be continuous like the currents of gas and of liquids. In this case the supply and efficient working of the apparatus are insured by employing the apparatus represented in Fig. 6 which comprises a closed hopper e periodically supplied with the solid matter which is to react in the column and a screw-conveyer f having rotary motion for feeding the matters into the column. The hopper is traversed by a vertical shaft provided with arms g for facilitating the discharge of the solid matters. In order that the solid matters may be held in perfect suspension in the liquid a diluter h provided with pallets i is, in some cases, interposed between the feed apparatus and the column, as represented in Fig. 7.

The herein described distilling apparatus may be applied to the distillation of ammoniacal waters which are deprived of their volatile salts upon the upper tray of the column, by simple ebullition and when they no longer contain any but fixed salts are brought in contact with lime supplied by the feed screw, which lime is maintained in suspension by the agitation produced in all parts of the column which also facilitates the reaction.

A distilling apparatus of this character to be complete should have combined with it means for heating the liquids entering at the expense of the liquids passing out; an analyzer for enriching the vapors; a steam drier; and a condenser-dissolver.

The operation of heating liquids as it is usually effected in tubular apparatus cannot be performed in the case of thick liquids, especially when they form deposits, as the heating surfaces become quickly coated and their effect is almost entirely neutralized. To obviate this the tubes are scraped continuously both on the inside and outside, as shown in Figs. 8, 9, 10 and 11, Figs. 8 and 9 being vertical sections, and Figs. 10 and 11 horizontal sections on line 1—1 and 2—2 respectively. The analyzer would differ in construction according as the liquids to be distilled are clear or thick. For clear liquids we adopt the type of analyzer represented in Fig. 12 composed of superposed elements, each formed of a set of tubes all contained in a trough filled with a refrigerating liquid which becomes gradually heated as it descends to the bottom of the apparatus. This liquid enters the uppermost tray $k'$, descends through tube $l$ into the tray $k^2$ next below, and so on, the liquid becoming gradually heated as it descends to the bottom of the apparatus. The steam circulates interiorly in the inverse direction to the liquid rising through the tubes $m$ in bubbles, as indicated by arrows $a$ through its own condensation, whereby a highly intense and at the same time a perfectly methodical interchange is effected.

The arrangement shown in Fig. 12 besides effecting the analysis of the vapors resulting from the principal distillation also permits of a preparatory distillation of the liquids while they are being heated. The gases evolved in this secondary distillation bubble from section to section of the apparatus, as indicated by the arrow B. This preparatory distillation produces different effects according to the nature of the liquids under treatment. In the case of ammoniacal liquids containing volatile salts, it causes the evolution of a very considerable quantity of carbonic and hydrosulphuric acids, which is gradually effected as the ammoniacal water attains a suitable temperature, the gases set at liberty bubbling up through water of a constantly-decreasing temperature which is supplied continuously. The ammoniacal salts deprived of a large quantity of their volatile acids, remain in solution in the water and descend from one section to another. This disassociation, among many other advantages, reduces the quantity of lime required in making volatile alkali, while in making concentrated liquors it permits of obtaining products of much greater richness and much less crystallizable. In operating upon liquids such as alcoholic worts or hydrocarbons, it permits of obtaining a classification and separation previous to distillation.

When the liquids to be heated are of a thick consistency it is absolutely necessary that the analyzer be provided with means of agitation as shown in Figs. 13 and 13$^{bis}$. The vapors to be analyzed enter the column near the low part at the level of the second tray, pass into the compartment $n'$, then traverse successively in the upward direction the compartments $n^2$, $n^3$, $n^4$, $n^5$, and leave the column at the topmost compartment $n^5$, their course being indicated by the arrows $j$. The condensation of these vapors follows the inverse course descending through compartments $n^5$, $n^4$, $n^3$, $n^2$, $n$, following the course indicated by the arrows $d$, and lastly flow back to the distilling apparatus. This rotary analyzer may be used either as a distilling column heated by indirect contact or as an apparatus for producing any desired reaction between gases and liquids either in a heated or cold condition, the temperature of the mixture being controlled by causing a circulation in the chambers of cold or hot water or steam. When the vapors are required to be drier and cooler than it is possible to obtain them in the analyzer, the latter should be surmounted by a drier, such as shown in Figs. 14 and 15.

In Fig. 15 the water enters tray $o$, passes by pipe $p$ into tray $o'$, and so on. The vapors circulate interiorly in the opposite direction, passing through pipes $n$, as in the analyzer.

The apparatus represented in Fig. 14 only differs from that last described in that the trays $o$ $o'$ are dispensed with.

The condensation of the gases is effected in an apparatus termed a condenser-dissolver, shown in Fig. 16, composed of a number of similar sections each formed of a hollow plate A cooled by a current of water and of a plate B placed above it. The gases to be condensed enter at the upper part of the apparatus and follow the direction indicated by the arrows. The pipes C through which the gases are forced to pass may be situated at a variable distance from the level of the liquid on plates B so that they may either be caused to slightly bubble through the liquid or simply pass over its surface. The surface at which they are brought in contact, either with the refrigerating walls or with the liquids already condensed and cooled, is in all cases, of considerable area and perfectly utilizes the material employed. Moreover the action of the cooling liquid is methodical and the condensed liquids can only escape after having been subjected to repeated coolings. The cooling liquid circulated may either be water or any other liquid to be heated.

Water or any other liquid may be introduced at the top of the apparatus to dissolve the vapors admitted.

The apparatus is constructed so as to be readily dismounted for inspection or cleaning in a rapid and convenient manner.

In Figs. 17 and 17$^a$, which show the general arrangement respectively with and without means of agitation for the analyzer, C is the propeller; D, the distilling column provided with means of agitation; E, the analyzer provided with means of agitation; F, the drier; G, the condenser; H, the heater provided with means of agitation.

The distilling apparatus forming the subject of this invention will distill all ammoniacal liquors of whatever kind with or without lime, all alcoholic liquors whether clear or thick, various hydrocarbons, &c.

We claim—

1. In an apparatus for distilling thick liquids, the following instrumentalities in operative combination, viz.: a distilling column provided with an agitator for agitating the liquids and preventing obstruction of the column, a feed conveyer for the solid reagents communicating therewith, an analyzer-separator also communicating with the column, a heater communicating with the analyzer-separator and provided with an agitator, and a condenser for the distilled products communicating with the heater, all substantially as described and for the purpose set forth.

2. In an apparatus for distilling thick liquids the following instrumentalities in operative combination, viz.: a distilling column provided with an agitator, for agitating the liquids, and preventing obstruction of the column, a feed conveyer for the solid reagents provided with a diluter and communicating with the column, an analyzer-separator also communicating with the column and provided with an agitator, a heater communicating with the analyzer-separator and provided with an agitator, and a condenser for the distilled products communicating with the heater, all substantially as described and for the purposes set forth.

3. In an apparatus for distilling thick liquids, the following instrumentalities in operative combination, viz.: a distilling column provided with an agitator for agitating the liquids, and preventing obstruction of the column, a feed conveyer for the solid reagents communicating therewith, an analyzer-separator also connected with the column and surmounted by a drier, a heater communicating with the analyzer-separator, and provided with an agitator, and a condenser for the distilled products communicating with the heater, all substantially as described and for the purposes set forth.

The foregoing specification of our system of apparatus for the distillation of turbid or thick liquids signed by us this 18th day of April, 1893.

PAUL ALFRED MALLET.
TIBURCE ALBERT PAGNIEZ.

Witnesses:
ROBT. M. HOOPER,
ALBERT MOREAU.